United States Patent [19]

Chan et al.

[11] Patent Number: 5,124,599
[45] Date of Patent: Jun. 23, 1992

[54] STEPPING MOTOR FOR TIMEPIECE

[75] Inventors: Chung Yeung Chan, Hong Kong, Hong Kong; Chong Sirivai, Bangkok, Thailand

[73] Assignee: Silcon Enterprises Ltd., Kowloon, Hong Kong

[21] Appl. No.: 671,535

[22] Filed: Mar. 19, 1991

[30] Foreign Application Priority Data

Apr. 11, 1990 [CH] Switzerland .................. 1236/90

[51] Int. Cl.[5] ............................................ H02K 37/00
[52] U.S. Cl. ............................ 310/49 R; 310/40 MM; 310/162
[58] Field of Search .......... 310/49 R, 162, 114, 310/118, 261, 40 MM, 46

[56] References Cited

U.S. PATENT DOCUMENTS

| 3,922,574 | 11/1975 | Whiteley | 310/156 |
| 4,477,759 | 10/1984 | Guerin et al. | 310/49 R |
| 4,644,207 | 2/1987 | Catterfield et al. | 310/126 |
| 4,713,565 | 12/1987 | Grosjean | 310/49 R |
| 4,912,832 | 4/1990 | Egger et al. | 310/49 R |

FOREIGN PATENT DOCUMENTS

| 2475247 | 8/1981 | France | 310/49 R |
| 58-9086(A) | 1/1983 | Japan | 310/49 R |
| 59-113750(A) | 6/1984 | Japan | 310/40 MM |
| 384067 | 11/1964 | Switzerland | 310/46 |

Primary Examiner—Steven L. Stephan
Assistant Examiner—Matthew Nguyen
Attorney, Agent, or Firm—Fleit, Jacobson, Cohn, Price, Holman & Stern

[57] ABSTRACT

A stepping motor for a timepiece has a coil (12), a single magnetic circuit, two stator pole pieces (10a, 10b), and two rotors in the form of axially magnetized permanent-magnet disks (13, 14). The two rotors are coaxial and disposed one on each side of a plane defined by the stator pole pieces defining gaps of different widths ($\delta_1$, $\delta_2$) between adjacent facing surfaces of said respective disks and said stator pole pieces.

8 Claims, 5 Drawing Sheets

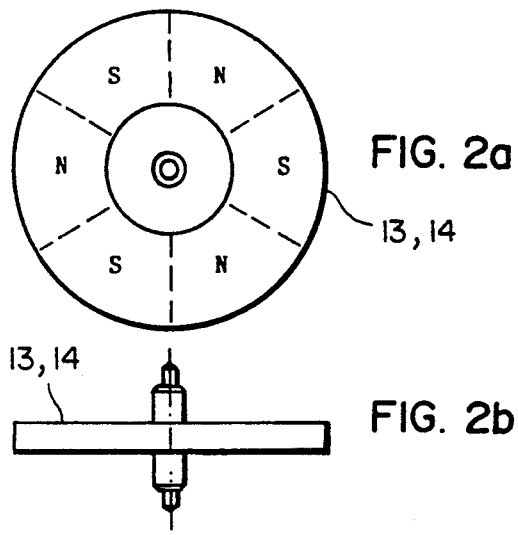
FIG. 2a
FIG. 2b
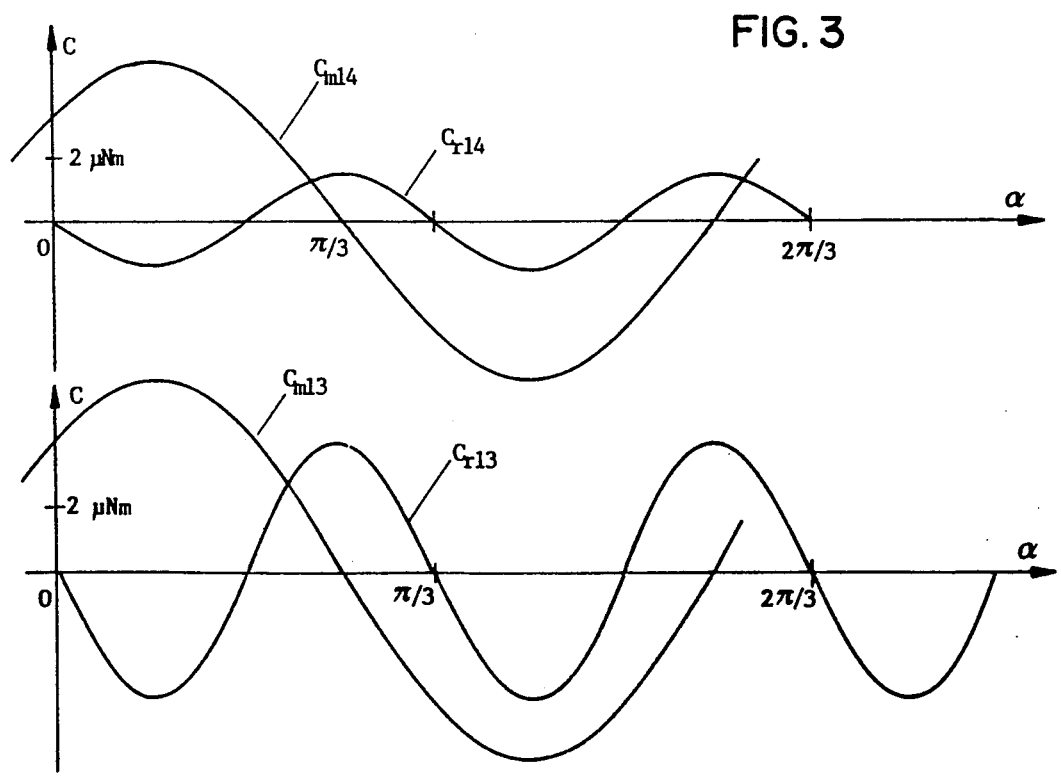
FIG. 3

STEPPING MOTOR FOR TIMEPIECE

BACKGROUND OF THE INVENTION

This invention relates to motors for use in watchmaking, and more particularly to a single-phase stepping motor for a timepiece, of the type having a single coil, a single magnetic circuit, and two rotors driving two mechanically uncoupled gear trains.

This type of motor is used whenever there is a need for gear trains which are mutually uncoupled mechanically and driven by different rotors, as in a watch having electronic time correction, for example. Such stepping motors form part of the prior art.

Japanese Laid-open Patent Application No. 58-9086, an abstract of which appears in *Patent Abstracts of Japan*, Vol. 7, No. 78, p-188, 1223, of Mar. 31, 1983, describes a motor including two mechanically uncoupled rotors actuated by a single coil. A drawback of this type of motor is having a relatively large surface due to the presence of two magnetic circuits in parallel. Moreover, it follows from the drawing that the rotors are of the bipolar type with radial magnetization. Such rotors have only two stable balance positions per rotation. In order to display the sixty seconds positions on a watch dial, therefore, it is necessary to have a transmission ratio of 30 between the shaft of the rotor and the arbor of the seconds-hand. This transmission ratio generally involves having two gear trains.

Another motor comprising a double rotor and intended for a timepiece movement is described in French Disclosed Application No. 2,475,247. The object to be achieved according to that application is essentially different from that of the present invention since there it is solely a matter of compensating for the axial mechanical reaction appearing during use of a motor comprising a single disk as a rotor. Furthermore, the two disks are fixed on a common shaft and rotate at the same speed.

For other applications, motors comprising a disk-shaped double rotor are used; in particular, U.S. Pat. No. 3,922,574 describes a larger motor intended for a compressor, a pump, or a blower and having two disk-shaped rotors disposed on either side of an annular stator winding. In this case, too, the two rotors rotate at the same speed, it being possible to apply different torques to them by using permanent magnets of different strengths on each of the disks.

Swiss Patent No. 384,067 proposes another application of such a motor including two disk-shaped rotors, each comprising a number of different poles and being disposed on a common shaft which can slide longitudinally so that the speed of rotation of the shaft can be selected by causing one or the other of the rotors to drive.

BRIEF SUMMARY OF THE INVENTION

It is an object of this invention to provide an improved timepiece stepping motor which remedies the aforementioned shortcomings.

To this end, in the motor according to the present invention, of the type initially mentioned, the rotors are composed of two permanent-magnet disks magnetized according to the axial direction and comprising the same number of poles distributed along the peripheries of the rotors, these rotors being coaxial, mounted on two independent shafts, and disposed on both sides of the plane constituted by the stator pole pieces.

Further objects of this invention are to provide a method of controlling such a motor and a watch having electronic time correction and utilizing such a motor.

BRIEF DESCRIPTION OF THE DRAWINGS

A preferred embodiment of the invention will now be described in detail with reference to the accompanying drawings, wherein:

FIGS. 2a and 2b are, respectively, diagrammatic views, in plan and elevation, of a magnetized rotor used in the motor of FIG. 1;

FIG. 3 is a graph of the static torques of the motor of FIGS. 1a and 1b;

DETAILED DESCRIPTION

Figure 1A:
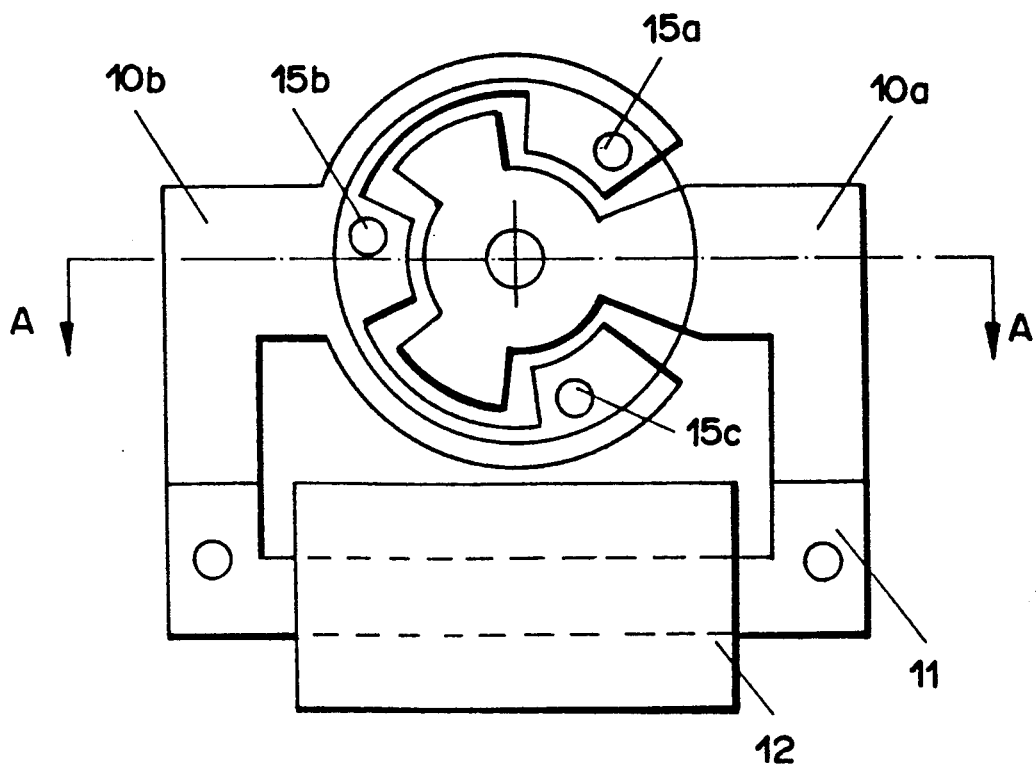
FIGS. 1a and 1b are, respectively, a diagrammatic plan view and an elevation, partially in cross-section taken along line A—A of FIG. 1a, of the motor of this invention.
Figure 1B:
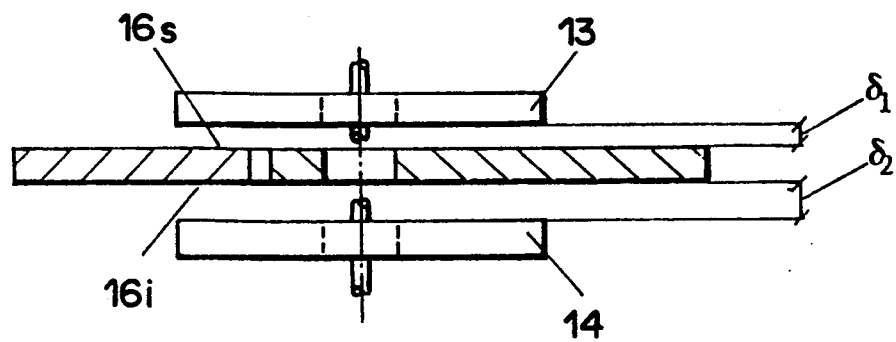

FIGS. 1a and 1b illustrate an embodiment of the inventive motor having a magnetic stator circuit including pole pieces 10a and 10b, a coil core 11, a coil 12, and rotors 13 and 14. Pole pieces 10a and 10b are made of a soft ferromagnetic material and are both situated in the same plane. The imbrication of pole pieces 10a and 10b makes it possible, upon application of a current to coil 12, to create alternating magnetic poles distributed on both the top surface 16s and the bottom surface 16i of the pole pieces. Situated at distances $\delta_1$ and $\delta_2$ from surfaces 16s and 16i, respectively, are coaxial rotors 13 and 14 in the form of permanent-magnet disks.

FIG. 2 shows one of the magnetized rotors with the distribution of magnetic poles along its periphery. Rotors 13 and 14, having their axis of rotation perpendicular to the plane of pole pieces 10a and 10b, are able to rotate freely relative to one another.

The toothed portion of pole piece 10b includes holes 15a, 15b, and 15c (FIG. 1a). These holes make it possible to give rotors 13 and 14 retention torques due to the variation of the reluctance of the magnetic circuit. The same effect may also be obtained by providing holes in the toothed portion of pole piece 10a. In the embodiment illustrated, air gaps $\delta_1$ and $\delta_2$ between rotors 13, 14 and stator 10 are different. The purpose of this is to create different retention torques at the level of the two rotors, permitting a selective control of rotation.

FIG. 3 is a diagram of the static torques exerted upon each rotor of the motor. In this drawing FIGURE, $C_{r14}$ represents the retention torque of rotor 14 and $C_{r13}$ that of rotor 13. The mutual torques due to the interaction of the stator and rotor fluxes are represented by $C_{m14}$ and $C_{m13}$. It will be noted that torques $C_{m14}$ and $C_{m13}$ are substantially equal, whereas $C_{r13}$ is much greater than $C_{r14}$.

Figure 4:
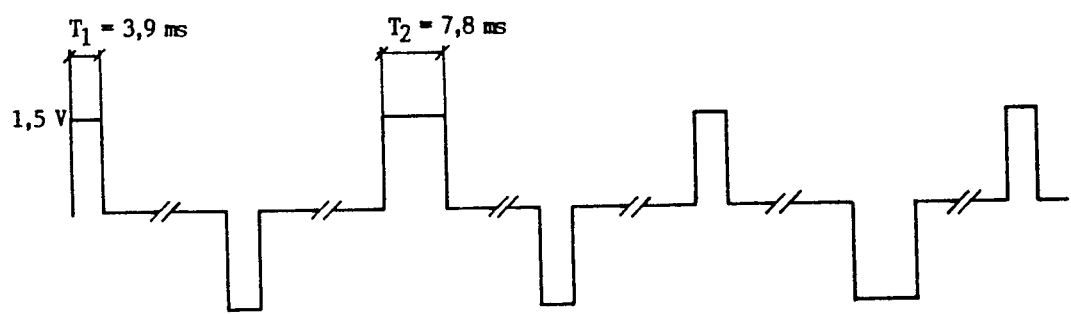
FIG. 4 is a diagram of the feed pulses of the motor of FIGS. 1a and 1b.

FIG. 4 gives an example of the feed pulses of the motor of FIGS. 1a and 1b, permitting rotor 14 to be rotated at an average speed three times as great as that of rotor 13. When coil 12 of the motor receives a pulse of a duration $T_1$ of 3.9 ms, both rotors move, but only rotor 14 can actually step owing to its weak retention torque, whereas rotor 13, because of the high torque $C_{r13}$, returns to its starting position after disappearance of the pulse. When the motor receives a pulse of a duration $T_2$ of 7.8 ms, both rotors step owing to the greater power supplied. It will be easily understood that with this type of feed pulse, different average speeds of rotation can be imparted to the two rotors.

Figure 5:
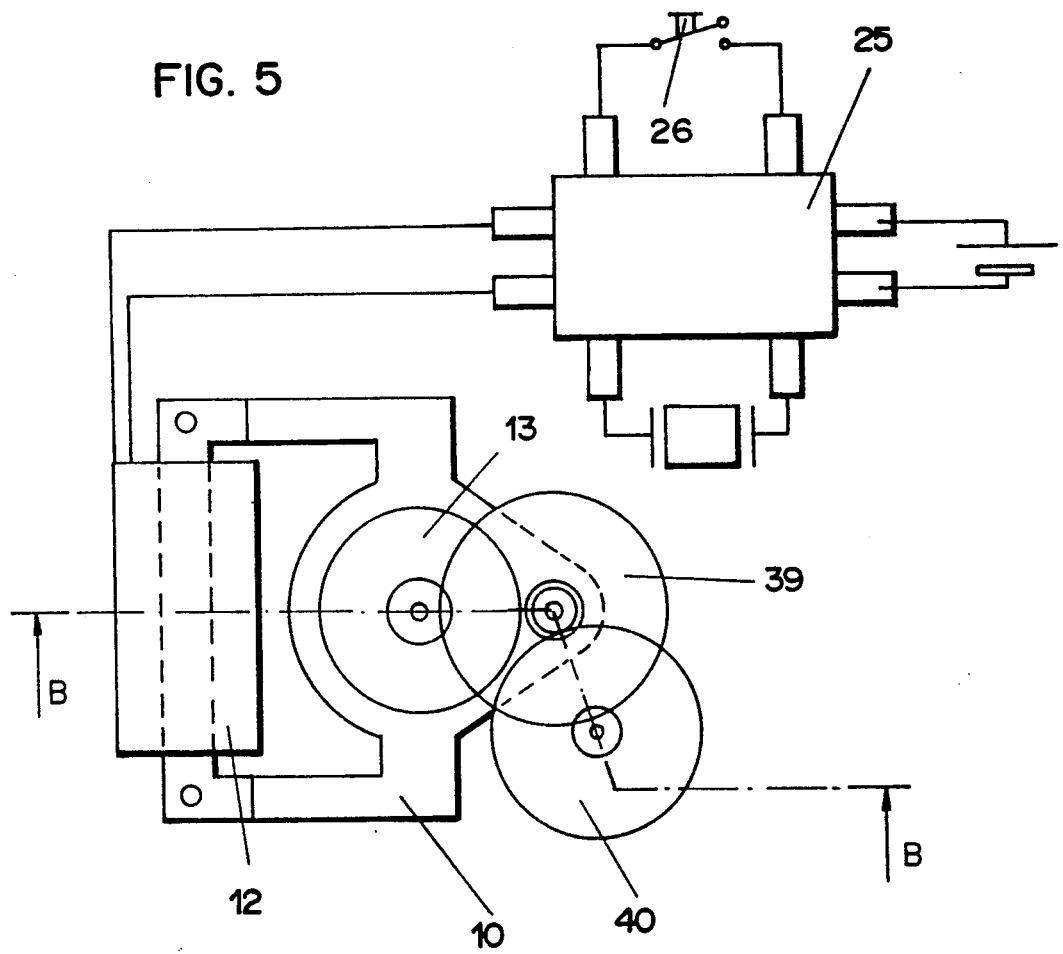
FIG. 5 is a diagrammatic plan view of an exemplified application of the motor in a watch having electronic time correction.

FIG. 5 shows an integrated circuit 25 connected to the stepping motor, represented here by coil 12, stator 10, and one of the two rotors, 13. By means of a switch 26, actuated by a push button, for instance, the frequency of the driving pulses for setting the movement can be changed. The wheel-train portion shown comprises rotor 13, an hour wheel 39, and a minute wheel 40.

Figure 6:
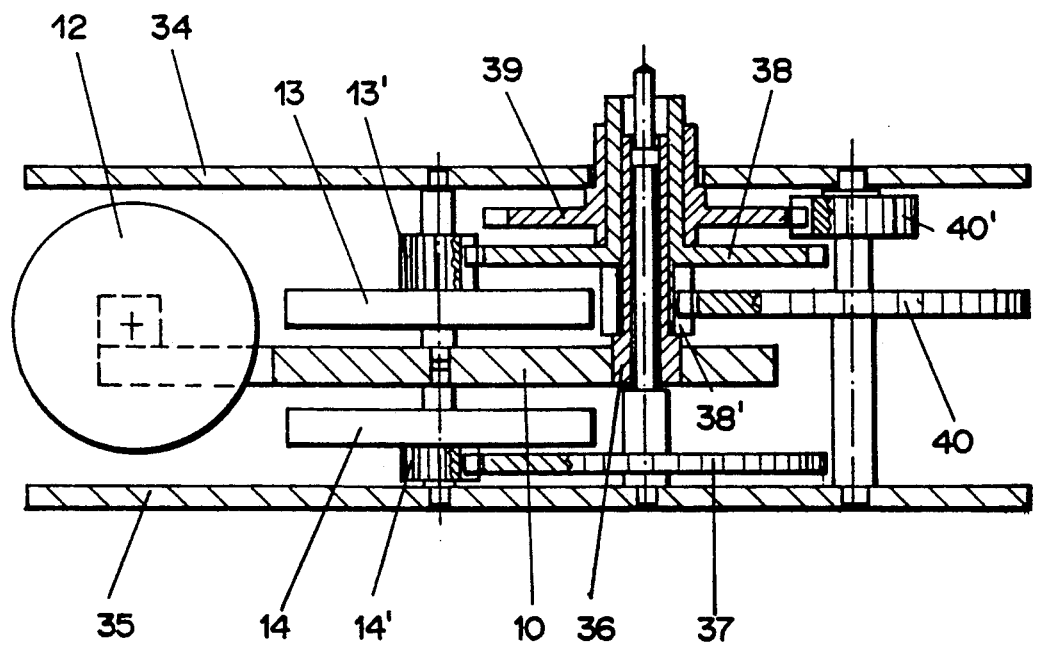
FIG. 6 is a cross-section view taken along line B—B of FIG. 6.

FIG. 6 is a section taken on the line B—B' of FIG. 5. The wheel train is accommodated with the aid of a bottom bridge 35, stator 10, and a top bridge 34. Pinion 14' of lower rotor 14 drives a fourth wheel 37. Fourth wheel 37 is seated in bottom bridge 35, on the one hand, and is guided by a pipe 36 driven into stator 10, on the other hand. Pinion 13' of upper rotor 13, beating the minute, drives a center wheel 38, the pinion 38' of which drives minute wheel 40. The pinion 40' of minute wheel 40 meshes with hour wheel 39.

We claim:

1. A single-phase stepping motor for a timepiece, comprising:
   a single coil;
   a single magnetic circuit;
   a stator having two stator pole pieces substantially in a same plane;
   two rotors;
   two mechanically uncoupled gear trains respectively driven by said two rotors;
   two axially magnetized permanent-magnet disks constituting said two rotors and each having the same number of magnetic poles distributed along peripheries thereof; and
   two separate coaxial shafts disposed one on each side of said plane, said rotors being respectively mounted on said shafts.

2. The motor as claimed in claim 1, and further comprising:
   air gaps between respectively adjacent facing surfaces of each of said rotors and said stator pole pieces, said air gaps being of appreciable different widths.

3. The motor as claimed in claim 2, wherein:
   one of said pole pieces has a plurality of holes therein for creating retention torques for said rotors.

4. The motor as claimed in claim 3, wherein said number of magnetic poles of each rotor is at least six.

5. A method of controlling a single-phase stepping motor having a single coil, a single magnetic circuit, two rotors in the form of axially magnetized permanent-magnet disks, each having the same number of magnetic poles distributed along peripheries thereof, two stator pole pieces, two mechanically uncoupled gear trains respectively driven by said two rotors, said method comprising:
   providing two separate coaxially shafts disposed one on each side of a plane defined by said stator pole pieces, wherein said rotors are respectively mounted on said shafts; and
   supplying the motor with a train of periodic pulses including two types of pulses of different durations.

6. The motor as claimed in claim 5 and further comprising:
   providing air gaps of different widths between respective adjacent facing surfaces of each rotor and said stator pole pieces.

7. A watch having electronic time correction and comprising:
   at least one single-phase stepping motor comprising a single coil, a single magnetic circuit, two rotors in the form of axially magnetized permanent-magnet disks, each having the same number of magnetic poles distributed along peripheries thereof, two stator pole pieces substantially in a same plane, two separate coaxial shafts disposed one on each side of said plane, said rotors being respectively mounted on said shafts; and
   two mechanically uncoupled gear trains respectively driven by said two rotors.

8. The motor as claimed in claim 7 and further comprising:
   air gaps of different widths between respective adjacent facing surfaces of each rotor and said stator pole pieces.

* * * * *